United States Patent [19]

Breckwoldt et al.

[11] Patent Number: 5,182,380

[45] Date of Patent: Jan. 26, 1993

[54] DIHYDROXYPROPYL SULPHOETHYL CELLULOSES, THEIR PREPARATION AND THEIR USE

[75] Inventors: Jörn Breckwoldt, Rotenburg; Klaus Szablikowski, Walsrode, both of Fed. Rep. of Germany

[73] Assignee: Wolff Walsrode Aktiengesellschaft, Walsrode, Fed. Rep. of Germany

[21] Appl. No.: 737,636

[22] Filed: Jul. 30, 1991

[30] Foreign Application Priority Data

Aug. 7, 1990 [DE] Fed. Rep. of Germany ....... 4024968

[51] Int. Cl.$^5$ ...................... C08B 11/193; C09K 7/02; C04B 40/00; C04B 24/38
[52] U.S. Cl. ........................ 536/90; 536/91; 536/92; 536/101
[58] Field of Search ...................... 536/84, 85, 90, 91, 536/92, 101

[56] References Cited

U.S. PATENT DOCUMENTS

| | | | |
|---|---|---|---|
| 4,013,821 | 3/1977 | Engelskirchen et al. | 536/91 |
| 4,096,326 | 6/1978 | Reid | 536/95 |
| 4,519,823 | 5/1985 | Hori et al. | 252/8.5 C |
| 4,550,161 | 10/1985 | Felcht et al. | 536/90 |
| 4,553,601 | 11/1985 | Almond et al. | 166/308 |

FOREIGN PATENT DOCUMENTS 0319865  6/1989  European Pat. Off. .
2265761 10/1975  France .

OTHER PUBLICATIONS

Paist, Cellulosics, Reinhold Pub. Corp., New York, 1958, p. 211.

*Primary Examiner*—Nathan M. Nutter
*Attorney, Agent, or Firm*—Sprung Horn Kramer & Woods

[57] ABSTRACT

Water-soluble, reversibly gelable cellulose ethers containing sulphoethyl groups (DS-sulphoethyl) and dihydroxpropyl groups (MS-dihydroxypropyl).

8 Claims, No Drawings

DIHYDROXYPROPYL SULPHOETHYL CELLULOSES, THEIR PREPARATION AND THEIR USE

This invention relates to reversibly gelable, water-soluble dihydroxypropyl sulphoethyl cellulose ethers and to their preparation and their use.

For process technical and application technical reasons it is advantageous to use cellulose ethers which are not influenced by electrolytes in aqueous systems, do not tend to foam and are capable of gelling reversibly. Cellulose mixed ethers carrying a dihydroxypropyl substituent are described in the Patent literature.

A process for the preparation of cellulose mixed ethers containing 2,3-dihydroxypropyl groups in addition to alkyl, hydroxyalkyl or carboxyalkyl groups is described in U.S. Pat. No. 4,013,821. The starting materials for the etherification with glycidol are the water-soluble alkyl, hydroxyalkyl and carboxyalkyl celluloses. No information is given about the chemical yield, based on glycidol.

U.S. Pat. No. 4,096,326 claims the reaction products of 3-chloro-1,2-propanediol or glycidol and cellulose ethers having a molar degree of substitution, based on the dihydroxypropyl group, greater than 1.4. The starting materials for the highly substituted thermoplastic dihydroxypropyl mixed ethers are hydroxyethyl cellulose, hydroxypropyl cellulose, carboxymethyl cellulose and methyl cellulose. The chemical yield, based on glycidol, is only 15%.

DE-A-32 38 278 describes a process for the preparation of carboxyalkyl polysaccharide (mixed) ethers with a low degree of substitution, which have improved solubility in water. The water-solubility of the carboxymethyl celluloses with a low degree of substitution is decisively influenced by the co-etherification of alkylene oxides, alkyl halides and/or glycidol. Co-etherification of ethylene oxide and propylene oxide is preferred.

Non-ionic dihydroxypropyl hydroxyalkyl celluloses are disclosed in U.S. Pat. No. 4,523,010. In a preferred embodiment of the Patent, water soluble hydroxyalkyl celluloses having a molar degree of substitution of from 1.5 to 3 are reacted with glycidol. Here again, the chemical yield based on glycidol is only about 40%.

A dihydroxypropyl hydroxyethyl cellulose having a molar degree of substitution MS with dihydroxypropyl groups of from 0.3 to 1.3 is described in U.S. Pat. No. 4,553,601. The starting material is again a hydroxyethyl cellulose. The efficiency of glycidol is stated to be 50%.

Water-soluble cellulose ethers carrying a dihydroxypropyl substituent with a molar degree of substitution of from 0.3 to 1.3 are disclosed in EP-A-0 176 940. The solubility in water of the claimed products is introduced from the start by the cellulose ethers which are reacted with glycidol, hydroxyethyl cellulose being particularly preferred.

One disadvantage of the known products is the high degree of substitution required for achieving solubility in water and the low chemical yields of glycidol during the process of separation.

It was an object of the present invention to provide water-soluble, reversibly gelable cellulose ethers, in particular with a low degree of substitution. Another object lay in the provision of a process of preparation providing a high yield of chemical products.

The present invention relates to water-soluble, reversibly gelable cellulose ethers having sulphoethyl groups and dihydroxypropyl groups.

Additionally to the sulphoethyl and dihydroxypropyl groups there can be the substituents as common in the cellulose ether chemistry like methyl, ethyl, hydroxyethyl, hydroxylpropyl, hydroxybutyl, carboxymethyl or dialkylaminoethyl.

The invention relates in particular to water-soluble, reversibly gelable cellulose ethers, characterised in that the average degree of substitution with sulphoethyl groups (DS-sulphoethyl) is from 0.05 to 0.4 and the molar degree of substitution MS with dihydroxypropyl groups, preferably 2,3-dihydroxypropyl (MS-dihydroxypropyl), is from 0.1 to 1.

In a preferred embodiment, at least 2 g per 100 g of water dissolve at 25° C. to form a clear solution.

Reversibly gelable cellulose ethers are compounds which are capable of forming pH-reversible gels with boron compounds. This phenomenon can only be observed in polysaccharides and polysaccharide derivatives if they contain 1,2-vicinal diol groups in the molecule (see Y. X. Zhang, J. Macromol. Chem. 1425 (8), 955 (1980) and J. K. Scumann in R. L. Davison, Handbook of Water Soluble Gums and Resins, Chapter 6, (1980)).

In a particularly preferred embodiment, the DS-sulphoethyl amounts to 0.1–0.2 and the MS-dihydroxypropyl to 0.2–0.5.

The invention further relates to a process for the preparation of a dihydroxypropyl sulphoethyl cellulose ether having a low degree of substitution, characterised in that in a special embodiment, the process is carried out in the following steps:

a. Formation of an alkali cellulose by the reaction of cellulose with an alkali, b. Reaction of the alkali cellulose with a compound transferring sulphoethyl groups, and c. Dihydroxypropylation after termination of the sulphoethylation by the addition of a compound transferring dihydroxypropyl groups.

Steps b and c could be carried out in a single stage, and steps b and c may be reversed.

As starting materials for the process according to the invention there may be used ground celluloses such as bleaching linters or wood cellulose. The viscosity stages of the products may be adjusted by choosing celluloses which have an appropriate average degree of polymerisation. Low viscosity products may be prepared by using celluloses which have been degraded oxidatively by conventional processes.

The alkalisation of cellulose and its subsequent etherification are carried out in the presence of organic solvents at a ratio by weight of solvent to cellulose of from 5 to 50:1, preferably from 10 to 25:1, most preferably from 15 to 20:1, in order to obtain uniformly etherified products. The organic solvents used may be lower alcohols preferably having from 2 to 4 carbon atoms per molecule, ethers preferably having 2 to 4 carbon atoms per molecule, ketones preferably having 2 to 6 carbon atoms per molecule or mixtures of these solvents.

The sodium hydroxide solution is added to the cellulose for alkalisation; the concentration of the sodium hydroxide solution should be from 40 to 100% by weight, preferably 100% by weight, and the quantity used should be not less than 1.5 mol of sodium hydroxide per mol of cellulose. According to the invention, the sulphoethylating agent is added either before the addition of sodium hydroxide or after the phase of alkalisation. For etherification, the reaction mixture is heated to temperatures from 50 to 100° C., preferably from 70° to 90° C. and the temperature level which has been adjusted is maintained until the reaction is completed. The reaction mixture is cooled before addition of the dihydroxypropylating agent, preferably to temperatures below 50° C., and part of the sodium hydroxide is optionally neutralised. The reaction mixture is then again heated to temperatures of 50°-100° C., preferably from 70°-90° C., and the etherification reaction is carried out at this temperature for 30 to 120 minutes, preferably for 60 to 90 minutes.

The reaction mixture is cooled and neutralised with conventional mineral acids or organic acids.

In a preferred embodiment, neutralisation is carried out in the presence of from 0.05 to 5% by weight (based on the quantity of cellulose used) of boric acid. The products thus obtained are readily dispersed in water and form a stable gel within a short time.

The crude products thus obtained are purified with aqueous organic solvents, preferably 70% methanol.

In another preferred embodiment, in which the sodium salt of vinyl sulphonic acid and 2,3-epoxypropanol are used as etherification agents, the alkali is extracted with aqueous organic solvents, preferably 70% methanol, after termination of the etherification reaction.

It is surprisingly found that for dihydroxypropyl sulphoethyl celluloses having a DS sulphoethyl of from 0.05 to 0.4 and an MS-dihydroxypropyl of from 0.1 to 1, preferably a DS-sulphoethyl of from 0.1 to 0.2 and an MS-dihydroxypropyl of from 0.2 to 0.5, the following desirable properties are combined in a cellulose derivative:

1. Solubility in hot and cold water,
2. the pH has no influence on the viscosity of the solutions,
3. solutions are insensitive to electrolytes,
4. the cellulose ether is not surface-active in its solutions and the solutions do not foam,
5. solutions of the cellulose ether can be reversibly gelled, and
6 preparation of the cellulose ether may be rendered ecologically advantageous (no formation of salts) by a special choice of etherifying agents.

In the cellulose ethers according to the invention, the term DS (degree of substitution) and MS (molar degree of substitution) have the usual meanings:

Each anhydroglucose unit in the cellulose molecule contains three hydroxyl groups.

DS is the average number of hydroxyl groups substituted in the cellulose per anhydroglucose unit.

MS is the average number of mols of reactants combined with the cellulose per anhydroglucose unit.

Preferred agents for transferring the sulphoethyl group are chloroethane sulphonic acid and especially the sodium salt of vinyl sulphonic acid.

Glycidyl acetate, 3-chloro-1,2-propanediol, 2,3-epoxy-1,4-butanediol and especially 2,3-epoxypropanol (glycidol) are preferred dihydroxypropylating agents.

Aqueous solutions of the cellulose ethers prepared according to the invention are subject only to a slight change in viscosity over a pH range of from 1 to 12. The solutions have the greatest viscosity stability in the pH range of from 6.5 to 8.0. Below pH 3, the solution may show a slight drop in viscosity due to acid hydrolysis. Under strongly alkaline conditions, some oxidative degradation may occur. This is illustrated in Table 1 by the summary of solubilities of different cellulose ethers in an acid medium.

TABLE 1

| Cellulose ether | Solubilities of different cellulose ethers in an acid medium | | | |
|---|---|---|---|---|
| | DS (CM) or (SE) | MS (HE) or (DHP) | pH | Solubility |
| CMC* | 0.9 | | 3.5 | — |
| CMHEC** | 0.3 | 0.7 | 2.8 | — |
| DHPSEC*** (according to the invention) | 0.18 | 0.19 | 2 | + |

*Carboxymethyl cellulose, Trade product
**according to US-A-2 618 632
***according to Example 5

One important property of the cellulose ethers according to the invention is the electrolyte stability of their aqueous solutions. In contrast to carboxymethyl cellulose (CMC) and dihydroxypropyl carboxymethyl cellulose (DHPCMC), which are also anion active polyelectrolytes, they are not precipitated as water-insoluble salts by polyvalent ions such as $Fe^{3+}$ or $Al^{3+}$ at the usual concentrations. Table 2 gives the quantity of salt in g which must be added to 100 g of a 2% solution before precipitation occurs.

TABLE 2

| Cellulose ether | Electrolyte stability of cellulose ethers | | | | | |
|---|---|---|---|---|---|---|
| | DS (CM)/(SE) | MS(DHP) | $FeCl_3$ | | $Al_2(SO_4)_3$ | |
| | | | 5 g | 10 g | 5 g | 10 g |
| CMC* | 0.9 | | — | — | — | — |
| DHPCMC** | 0.43 | 0.49 | — | — | — | — |
| DHPSEC*** (according to the invention) | 0.18 | 0.19 | + | + | + | + |

*conventional Trade product
**according to DE-A-32 38 278
***according to Example 5
— = precipitation
+ = stability Aqueous solutions of the cellulose ethers prepared according to the invention manifest only slight interface active properties and hardly any tendency to foam. The interface tension of 1% solutions is in the region of from 57 to 65 mN/m (pure water has 72 mN/m). In Table 3, the interface tension of DHPSEC according to the invention is compared with those of some commercial cellulose ethers. The interface tension was determined by the ring extraction method which measures the tension required in the spring of balances for pulling a ring out of a 0.1% cellulose ether solution. A tensiometer manufactured by Krüβ was used for this purpose.

TABLE 3

| Interface tension of cellulose ethers (taken from E. D. Klug, Food Technology 24 (1979), 51) | | | |
|---|---|---|---|
| CE | DS | MS | Interface tension 0.1% solution (mN/m) |
| CMC | 0.8 | | 71 |
| HEC | | 2.5 | 64 |
| MHPC | 1.6-1.7 | 0.1-0.2 | 44-50 |
| MC | 1.8 | | 47-53 |
| HPC | | 4 | 45 |
| DHPSEC* (according to the | 0.18 | 0.19 | 57-65 |

TABLE 3-continued

Interface tension of cellulose ethers (taken
from E. D. Klug. Food Technology 24 (1979), 51)

| CE | DS | MS | Interface tension 0.1% solution (mN/m) |
|---|---|---|---|
| invention) | | | |

*according to Example 5

The ionic dihydroxypropyl sulphoethyl celluloses prepared according to the invention form stable elastic gels with polyvalent metal cations such as zirconium, titanium, antimony or boron in the form of salts or chelate complexes in an aqueous medium.

Cross-linked polymer gels are of interest for the development of oil and natural gas deposits. Natural gas, for example, can be economically conveyed from deposits at great depth through relatively impenetrable rock by producing fractures in the rock several 100 meters in length by the Frac process (hydraulic fracturing) using a high hydraulic pressure fracturing fluids injected through the borehole, thereby providing artificial flow paths for the gas. The gel must be completely removed from the formation after completion of the Frac treatment. Cellulose ethers capable of being cross-linked with metal ions are anion-active, modified hydroxyethyl celluloses containing, for example, carboxylic acid groups (U.S. Pat. No. 4,035,195) or phosphoric acid groups (U.S. Pat. No. 4,396,433). A carboxymethyl hydroxyethyl cellulose is at present the only anionic cellulose ether used in Frac drilling. The cross-linking reaction is carried out with titanium or aluminium salts, generally at a pH below 5. Under these conditions, the cellulose ethers used undergo acid catalysed degradation. These gels are thus less stable than those prepared at a neutral or slightly alkaline pH.

Further, anionic cellulose ethers react with iron ions when stored in steel tanks, which is usual. The reaction with the iron ions leads to flocculation of the cellulose ether.

Both non-ionic "hydraulic fluids" having vicinal dihydroxy-propyl groups (U.S. Pat. No. 4,096,326; U.S. Pat. No. 4,553,010; U.S. Pat. No. 4,553,601 and EP-A 0 176 940) and ionic "hydraulic fluids" of this kind (U.S. Pat. No. 4,096,326 and EP-A-0 176 940) are known from the Patent literature.

The disadvantages of modified, non-ionic hydroxyalkyl celluloses (HEC, HPC, HEHPC) lie on the one hand in the sometimes very high MS of vicinal dihydroxypropyl groups (U.S. Pat. No. 4,096,326) and on the other hand in the high molar substitution of hydroxyalkyl groups required for solubility in water.

An anion active dihydroxypropyl carboxymethyl cellulose (DHPCMC) has the following disadvantages:

a. a very high molar degree of substitution of vicinal dihydroxypropyl groups is sometimes required (MS>1.4), b. DHPCMC is incompatible with electrolytes, especially with iron and aluminium ions (see above), and c. poor capacity for gelling.

Gels prepared by the dihydroxypropyl sulphoethyl celluloses claimed for the present invention have the following desirable properties:

1. The gels cannot be liquefied by high shearing forces, 2. the gels are temperature stable, and 3. cross-linking is pH-reversible if gelling was initiated with boron compounds.

The metallic complex-forming agents hitherto used include antimony salts, aluminium salts, chromium salts and certain organic titanates but all these complex forming agents are limited in their use by the fact that specific conditions as regards pH, temperature, other chemicals, etc. must be observed to enable the complex forming reaction to take place between the complex forming agent and the polysaccharide used. For antimony complex-forming agents, for example, the aqueous solution must have a specific pH and a specific temperature before the complex forming reaction will take place. Other metal-containing complex forming agents such as chromium salts require an oxidation/reduction for cross-linking.

Titanium and zirconium compounds have been described as particularly advantageous for the cross-linking of polysaccharides (GB-A-2 108 122, EP-A-0 208 373), but these compounds have the disadvantage of being difficult to obtain and expensive.

Boron compounds have been found to be particularly advantageous for cross-linking the dihydroxypropyl sulphoethyl celluloses prepared according to the invention. Suitable boron compounds are, see U.S. Pat. No. 4,013,321, 4,35:

If preparation of the DHPSEC according to the invention was not carried out according to the preferred embodiment (see page 6, paragraph 3), then the boron compound is dissolved in water or added as a solid to the aqueous solution of cellulose ether and briefly stirred in. Gelling takes place after a short time.

The addition of from 0.2 to 0.5% by weight of cross-linking agent is sufficient to produce an excellent gel. The cross-linking is not influenced by electrolytes. Table 4 shows the superiority of the cellulose ethers prepared according to the invention compared with a dihydroxypropyl carboxymethyl cellulose.

TABLE 4

| | Borax | | | Triethanol titanate 1% by wt. |
|---|---|---|---|---|
| | 0.5% by wt | 5% by wt. | 5% by wt. $Fe^{3+}$ | |
| DHPCMC* | − | + | − | − |
| DHPSEC** (according to the invention) | + | + | + | + |

*according to DE-A-32 38 278
**according to Example 5
− no gel formation
+ gel formation A special property of cellulose ethers prepared according to the invention is their liquefying action in cement and gypsum systems used for facings. They may therefore be used as additives for fluid plastering materials based on cement or gypsum.

EXAMPLES

The viscosities $V_2$ were measured according to DIN 53 019 with a rotation viscosimeter Haake, Model RV 100, System M500, measuring device MV, at a shearing velocity of $D=2.5$ s$^{-1}$ and at a temperature of 20° C. The measurements were carried out on 2% by weight solutions in distilled water in each case.

EXAMPLE 1

27 g of finely ground wood cellulose are suspended in 3 l of isopropanol containing 7.5% by weight of water in a 3 l glass reactor flushed with inert gas, and 75.5 g of NaOH (pellets) are added and the mixture is alkalised for one hour at room temperature. After alkalisation, 0.24 mol of the sodium salt of vinyl sulphonic acid (VSSNa; 30% aqueous solution) are added to the alkali cellulose. The temperature in the glass reactor is slowly raised to 70° C. and maintained at this level for 90 minutes. After the reactor has cooled, the mixture is neutralised with acetic acid, purified with 70% methanol and dried. The sulphoethyl cellulose thus obtained is suspended in 3 l of acetone containing 2% by weight of water, and the mixture is alkalised for one hour at room temperature after the addition of 31 g of sodium hydroxide. The reactor is heated to 55° C. and 87.3 g of glycidol are added dropwise at this temperature within 15 minutes. After an etherification time of 90 minutes, the product is neutralised with acetic acid, purified with 70% methanol and dried.

The DHPSEC obtained has the following degrees of substitution:
DS (SE): 0.18
MS (DHP): 0.8.

The yield of chemicals, based on VSSNa, is 60%.
The yield of chemicals, based on glycidol, is 57%.

EXAMPLE 2

127 g of finely ground, highly viscous wood cellulose are suspended in 3 l of acetone in a 3 l glass reactor flushed with inert gas, and 47.2 g of NaOH (pellets) and 0.31 mol of VSSNa (30% aqueous solution) are added. The total quantity of water in the slurry is adjusted to 5% by weight. After a period of alkalisation of 80 minutes at room temperature, the reaction flask is slowly heated to 55° C. After an etherification time of 90 minutes, 52.4 g of glycidol are added to the reaction slurry at 55° C. within 30 minutes. After a further reaction time of 60 minutes, the reaction slurry is neutralised with acetic acid and purified with 70% methanol.

The water-soluble DHPSEC obtained has the following characteristics:
DS (SE): 0.21
MS (DHP): 0.39
$V_2$: 34,281 mPa.s

EXAMPLE 3

A DHPSEC is prepared as in Example 2. The product is suctioned filtered after etherification has terminated but before neutralisation. The alkali is extracted from the crude product with 70% methanol.

The DHPSEC obtained has the following characteristics:
DS (SE): 0.21
MS (DHP): 0.39
$V_2$: 25,620 mPa.s

EXAMPLE 4

127 g of finely ground, highly viscous wood cellulose are suspended in 3 l of acetone in a 3 l glass reactor flushed with inert gas, and 47.2 g of NaOH (pellets) and 0.31 mol of VSSNa (30% aqueous solution) are added. The total quantity of water in the slurry is adjusted to 5% by weight. After an alkalisation time of 80 minutes at room temperature, the reaction vessel is slowly heated to 55° C. After an etherification time of 90 minutes at 55° C., 87.3 g of glycidol are added dropwise to the reaction slurry within 30 minutes. After a further reaction time of 60 minutes, the reaction slurry is neutralised with acetic acid containing 2 g of boric acid, and the product is purified with 70% methanol.

The DHPSEC obtained is readily dispersed in water and forms a very solid gel within a short time. It has the following degrees of substitution:
DS (SE): 0.19
MS (DHP): 0.58.

EXAMPLE 5

127 g of finely ground, low viscosity wood cellulose are suspended in 3 l of isopropanol in a 3 l glass reactor flushed with inert gas, and 75.2 g of NaOH (pellets) and 0.3 mol of VSSNa (30% aqueous solution) are added. The total quantity of water in the slurry is adjusted to 7.5% by weight. After an alkalisation time of 80 minutes at room temperature, the reaction vessel is slowly heated to 70° C.

After an etherification time of 90 minutes, the slurry is neutralised with acetic acid and purified with 70% methanol. The purified SEC is suspended in 3 l of acetone in a 3 l glass reactor flushed with inert gas, and 15.6 g of NaOH (pellets) are added. The quantity of water in the slurry is adjusted to 2% by weight. After an alkalisation time of 60 minutes at room temperature, the reaction vessel is heated to 55° C. and the glycidol (88 g) is added dropwise to the reaction slurry within 60 minutes. After an etherification time of 90 minutes, the reaction slurry is neutralised with nitric acid and purified with 70% methanol.

The water-soluble DHPSEC obtained has the following characteristics:
DS (SE): 0.18
MS (DHP): 0.19
$V_2$: 769 mPa.s

We claim:

1. Water-soluble, reversibly gelable cellulose ethers having an average degree of substitution with sulphoethyl groups (DS-sulphoethyl) of from 0.05 to 0.4 and a molar degree of substitution with dihydroxypropyl groups (MS-dihydroxypropyl) of from 0.1 to 1.

2. Cellulose ethers according to claim 1, characterised in that at least 2 g dissolve in 100 g of water at 25° C.

3. Cellulose ethers according to claim 1, characterised in that the DS-sulphoethyl amounts to 0.1–0.2 and the MS-dihydroxypropyl to 0.2–0.5.

4. Cellulose ethers according to claim 1, characterised in that the dihydroxy-propyl substituent is 2,3-dihydroxypropyl.

5. A composition comprising a cellulose ether according to claim 1 and a complex forming agent.

6. A composition according to claim 5, wherein the complex forming agent is a boron compound.

7. In a cement or gypsum plaster containing a liquefier, the improvement which comprises using as said liquefier a cellulose ether according to claim 1.

8. In the opening up of an oil or natural gas deposit by Frac drilling employing a cellulose ether, the improvement which comprises using as said cellulose ether a cellulose ether according to claim 1.

* * * * *